(12) United States Patent
Zhu

(10) Patent No.: US 12,552,432 B2
(45) Date of Patent: Feb. 17, 2026

(54) COLLAPSIBLE WAGON TAILGATE

(71) Applicant: MAXTON ENGINEERING LTD., Central (HK)

(72) Inventor: Shou Qiang Zhu, La Verne, CA (US)

(73) Assignee: MAXTON ENGINEERING LTD., Central (HK)

( * ) Notice: Subject to any disclaimer, the term of this patent is extended or adjusted under 35 U.S.C. 154(b) by 383 days.

(21) Appl. No.: 18/190,096

(22) Filed: Mar. 26, 2023

(65) Prior Publication Data

US 2023/0322284 A1    Oct. 12, 2023

Related U.S. Application Data

(60) Provisional application No. 63/324,085, filed on Mar. 27, 2022.

(51) Int. Cl.
*B62B 3/02*    (2006.01)

(52) U.S. Cl.
CPC .................................... *B62B 3/025* (2013.01)

(58) Field of Classification Search
CPC ....... B62B 3/025; B62B 3/007; B62B 3/1468; B62B 5/087; B62B 5/0093; B62B 2205/06; B62B 2205/30; B62B 2205/32; B62B 2205/33; B62B 2206/006; B62B 2206/04; B62B 1/002
See application file for complete search history.

(56) References Cited

U.S. PATENT DOCUMENTS

| | | | |
|---|---|---|---|
| 5,547,205 A * | 8/1996 | do Rosario Sousa de Cabedo ..... | B62B 5/085 297/14 |
| 8,029,007 B2 * | 10/2011 | Jones ..................... | B62D 63/00 280/47.131 |
| 9,738,298 B1 * | 8/2017 | Yang ....................... | B62B 3/025 |
| 10,435,055 B1 * | 10/2019 | Zhu ........................ | B62B 3/007 |
| 10,703,399 B2 * | 7/2020 | Ostergaard ............. | B62B 3/008 |
| 11,285,983 B1 * | 3/2022 | Horowitz ................. | B62B 3/02 |
| 11,685,416 B2 * | 6/2023 | Yang ....................... | B62B 3/025 280/651 |

FOREIGN PATENT DOCUMENTS

| | | | | |
|---|---|---|---|---|
| EP | 1733946 A1 * | 12/2006 | .............. | B62B 3/02 |
| FR | 1335086 A * | 8/1963 | ........... | B62B 3/1476 |

* cited by examiner

*Primary Examiner* — Steve Clemmons
(74) *Attorney, Agent, or Firm* — LIU & LIU

(57) ABSTRACT

A collapsible wagon with a foldable/collapsible tailgate frame assembly coupled to a collapsible wagon frame assembly. The collapsible wagon frame assembly has a collapsible frame having a rear frame. The tailgate frame assembly has a tailgate platform having a pair of side rails, each pivotally connected to a corresponding bottom portion near the base of the rear frame, and a slider slidable along the corresponding side rails. A wheel support frame has ends each pivotally connected to a corresponding one of the side rails. A first connection member is pivotally connected to the slider and a wheel support frame, and a second connection member is pivotally connected to the slider and the rear frame. The tailgate frame assembly transitions between a collapsed state and an extended state with each slider sliding along a corresponding side rail.

18 Claims, 15 Drawing Sheets

COLLAPSIBLE WAGON TAILGATE

PRIORITY CLAIM

This application claims the priority of U.S. Provisional Patent Application No. 63/324,085 filed on Mar. 27, 2022. This application is fully incorporated by reference as if fully set forth herein. All publications noted below are fully incorporated by reference as if fully set forth herein.

FIELD OF THE INVENTION

The present invention is directed to a collapsible and portable wagon, and in particular to a collapsible wagon that can be used to store and transport various items, and the size of the wagon can be easily minimized when not in use.

BACKGROUND OF THE INVENTION

In recent years, more and more people love outdoor and recreational activities such as camping, field trips, or Bar-B-Q during their free time because many people may endure high pressure at work, and have accumulated a lot of tension and stress. Not only can these outdoor activities help people release the stress, but also improve quality of life. When people enjoy their outdoor activities, wagons or wagons are primarily used for storing and transporting food, groceries and Bar-B-Q items, and even little child can be put therein.

Throughout the time, collapsible and portable wagons have been developed so the wagons can be transported in a confined space (such as vehicle trunk), and quickly converted into a three-dimensional space supported by wheels to store and transport a plurality of items when arriving to the outdoor destination such as parks, camping site, beaches, etc. Generally, a collapsible wagon has a collapsible frame which is readily folded up into a closed position having a narrow lateral profile and folded open back into the fully open position when needed. In the fully open position the cart will structurally support a storage container full of files or other items. No tools or other means are needed to fold up the cart into the folded position or to unfold the cart back into the fully open position.

U.S. Pat. No. 10,435,055, commonly assigned to Maxton Engineering Ltd, the assignee of the present invention, discloses a compact collapsible cart or wagon that improved over the prior art collapsible wagons that have too many conjugating points that would weaken the structure of the collapsible carts, and that is inconvenient for the users to engage/disengage every conjugating points when the users want to use or store them. The inventive collapsible wagon can be stored and moved more conveniently and efficiently without putting any additional or unnecessary burden on the users. The size of the collapsible wagon can be easily minimized by collapsing its frame so that the user can easily transport the cart to any destination the user wants to go, and use the cart at the destination, such as a camping spot, park, etc. The new and improved collapsible wagon is more convenient and efficient for the users to unfold or store without putting any additional or unnecessary burden on the users.

U.S. Pat. No. 10,703,399 disclosed a trailer assembly provided for a collapsible wagon. According to the Abstract in this patent, the trailer assembly has a trailer frame comprising a first frame pivotally connected to the wagon, a second frame pivotally connected to the wagon, and a first link pivotally connecting the first frame to the second frame. The trailer frame is positionable between a first or use position and a second or folded position, A wheel is rotatedly connected to the trailer frame to support the trailer frame in the use position. The disclosed trailer assembly was designed to allow a small person, e.g., a toddler, to sit or stand of the trailer when in use. However, structure of the trailer assembly disclosed in this patent does not appear to be sturdy enough for heavier load.

There remains a need for a new and improved collapsible wagon trailer or tailgate that provides a sturdy foldable platform to support a heavier load without substantially increasing the size and weight of the overall collapsible wagon.

SUMMARY OF THE INVENTION

In one aspect, the present invention provides a wagon that comprises a wagon frame assembly and a foldable/collapsible tailgate frame assembly coupled to the collapsible wagon frame assembly. The wagon frame assembly has a collapsible frame having a rear frame. The tailgate frame assembly has a tailgate platform having a pair of side rails, each pivotally connected to a corresponding bottom portion near the base of the rear frame of the wagon frame assemble, and a slider slidable along the corresponding side rails. A wheel support frame has ends each pivotally connected to a corresponding one of the side rails. A first connection member is pivotally connected to the slider and a wheel support frame, and a second connection member is pivotally connected to the slider and the rear frame. The tailgate frame assembly transitions between a collapsed state and an extended state with each slider sliding along a corresponding side rail.

In one embodiment, the wagon frame assembly is a collapsible wagon frame assembly that comprises a collapsible frame having a front frame supporting front wheels at a base/bottom of the front frame, a rear frame supporting rear wheels at a base/bottom of the rear frame, and a pair of side frames that are each pivotally collapsible, wherein the front frame, the rear frame and the pair of side frames in their extended state define a space for receiving a basket for holding items to be transport by the collapsible wagon. In one embodiment, the tailgate frame assembly has a tailgate platform having a pair of side rails, each having a proximal end pivotally connected to a location along a corresponding bottom portion near the base/bottom of the rear frame, and a slider slidable along the corresponding side rails. A wheel support frame has ends each pivotally connected to a corresponding one of the side rails. At least one wheel is supported by the wheel support frame below a bottom of the tailgate platform.

In one embodiment, the tailgate frame assembly further comprises a first connection member having a first end pivotally connected to the slider and a second end pivotally connected to a wheel support frame at a location below the corresponding side rail, and a second connection member having a second end pivotally connected to the slider and a second end pivotally to a location of the rear frame below the location along the corresponding bottom portion of the rear frame at which the proximal ends of the side rails are pivotally connected to the base/bottom portion of the rear frame.

The tailgate frame assembly can transition between a folded/collapsed state and an unfolded/extended state. In the folded/collapsed state, the tailgate platform is folded towards the rear frame of the wagon with its side rails pivoted towards the rear frame, the wheel support frame folded towards the bottom of the tailgate platform, and the sliders slide along the corresponding side rails towards the rear frame of the wagon thus collapsing the first and second connection members against the corresponding side rails.

In the unfolded/extended state, the tailgate platform is folded away from the rear frame of the wagon with its side rails pivoted away from the rear frame, the wheel support frame unfolded away from the bottom of the tailgate platform, and the sliders slide along the corresponding side rails away from the rear frame of the wagon thus extending/ expanding/pivoting the first and second connection members away from the corresponding side rails.

In one embodiment, in the unfolded/extended state, the first and second connection members, the corresponding side rail, a corresponding vertical portion of the wheel support frame and a bottom portion of the rear frame of the wagon form a triangle truss structure comprising a first triangle and a second triangle.

In one embodiment, the first connection member, a corresponding vertical portion of the wheel support frame and the corresponding side rail form the first triangle in the triangle truss structure, and wherein the second connection member, the corresponding bottom portion of the rear frame and the corresponding side rail form the second triangle in the triangle truss structure.

In one embodiment, the corresponding bottom portion of the rear frame comprises a vertical portion and an extended portion extending to connect to a support for the correspond rear wheel.

In one embodiment, the support for each of the rear wheels are not pivotally supported by the rear frame to rotate with respect to the rear frame.

In one embodiment, the front wheels are pivotally supported by the front frame to rotate with respect to the front frame.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals/designations designate like or similar parts throughout the drawings.

DESCRIPTION OF ILLUSTRATED EMBODIMENTS

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1A:
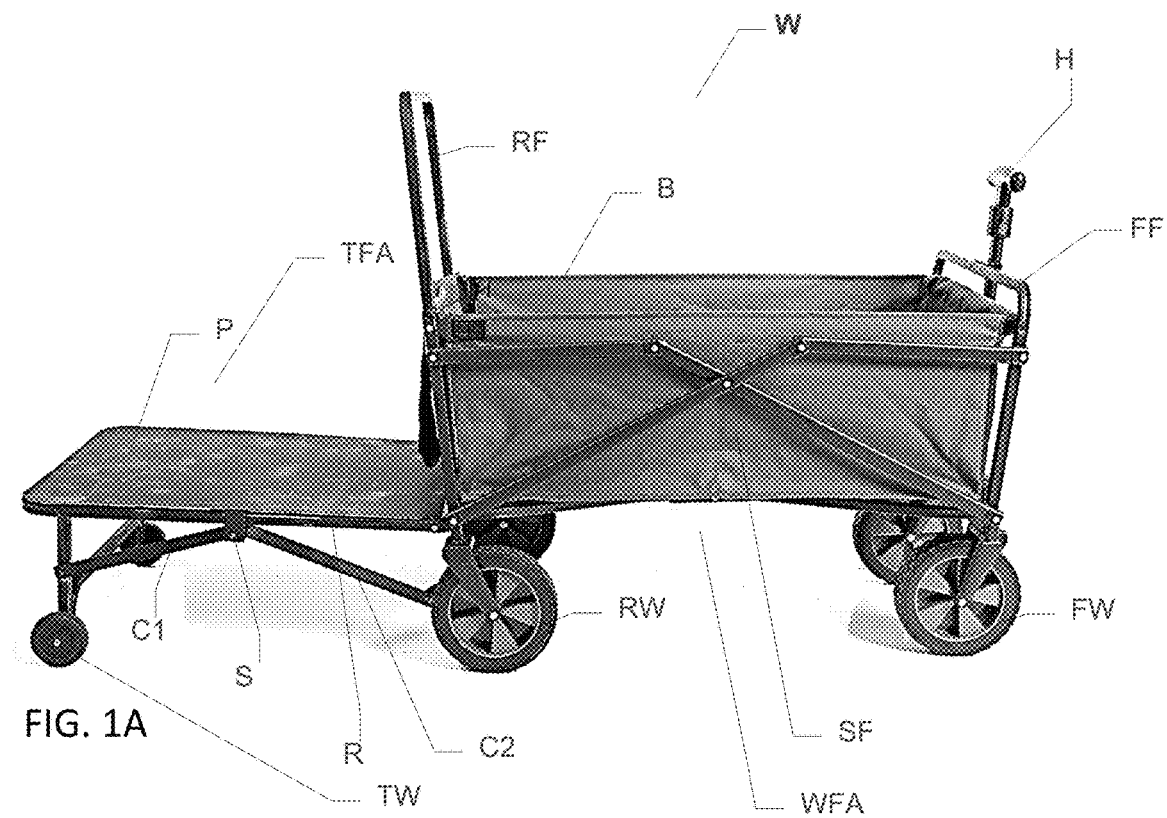
FIGS. 1A and 1B are side and bottom views of a collapsible wagon having a tailgate, shown in a fully unfolded/ extended state, comprising a wagon frame assembly, a tailgate frame assembly and a flexible basket attached thereon, in accordance with one embodiment of the present invention.
Figure 1B:
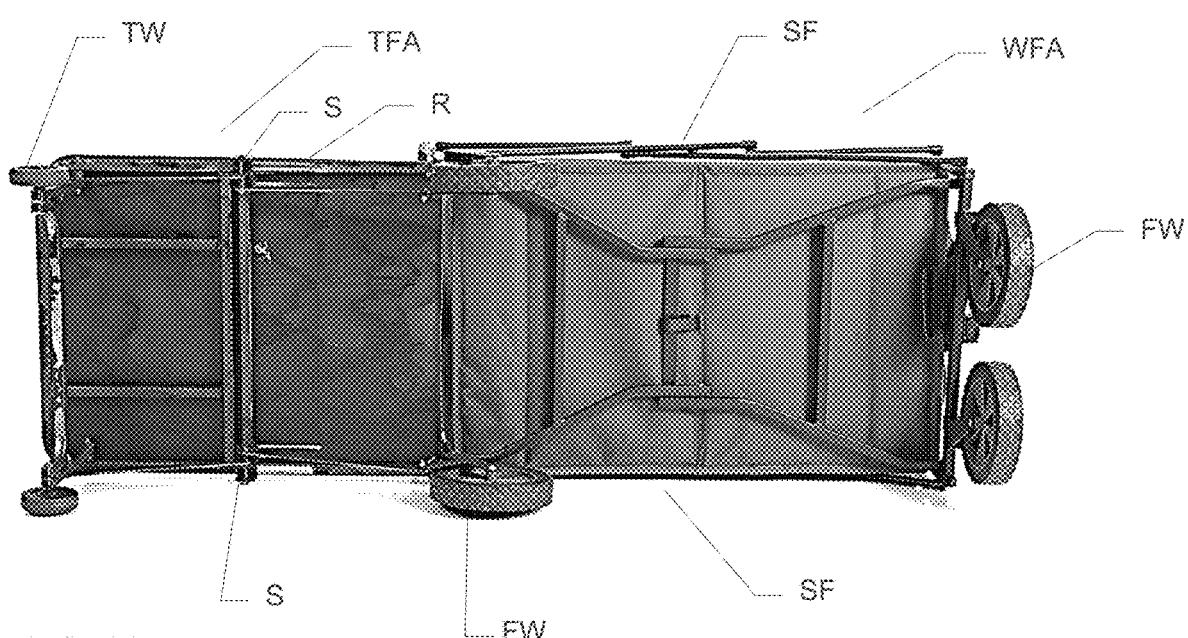

FIGS. 1A and 1B are side and bottom views of a collapsible wagon W having a tailgate, shown in a fully unfolded/ extended state, comprising a wagon frame assembly WFA, a tailgate frame assembly TFA and a flexible basket B attached thereon, in accordance with one embodiment of the present invention. As shown in the illustrated embodiment, the inventive collapsible wagon generally comprises a collapsible wagon frame assembly WFA and a foldable/collapsible tailgate frame assembly TFA coupled to the wagon frame assembly WFA. The collapsible wagon frame assembly WFA generally comprises a collapsible frame having a front frame FF supporting front wheels FW at a base/bottom of the front frame FF, a rear frame RF supporting rear wheels RW at a base/bottom of the rear frame RF, and a pair of side frames SF that are each pivotally collapsible, wherein the front frame FF, the rear frame RF and the pair of side frames SF in their extended state define a space for receiving a basket B for holding items to be transport by the collapsible wagon W. Further references can be made to U.S. Pat. Nos. 10,435,055 and 8,011,686 to adopt a similar structure for the collapsible wagon frame assembly, subject to modification with the wagon tailgate frame assembly disclosed herein.

Figure 2:
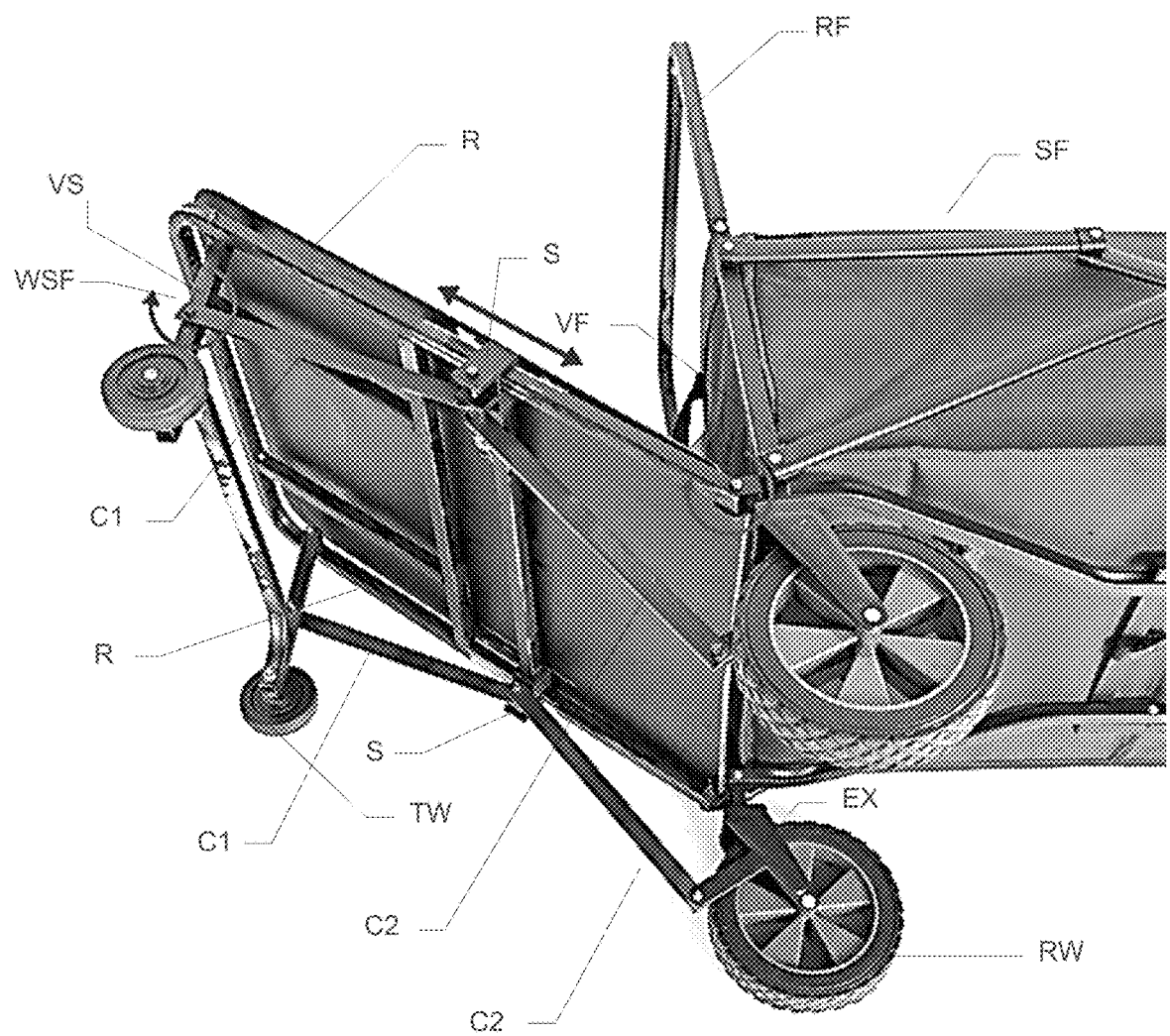
FIG. 2 is bottom perspective view of the tailgate frame assembly.

Referring also to FIG. 2, the foldable/collapsible tailgate frame assembly TFA comprises a tailgate platform P having a pair of side rails R, each having a proximal end pivotally connected to a location along a corresponding bottom portion near the base/bottom of the rear frame RF. In the illustrated embodiment, the side rails R are part of a U-shaped structure. It further comprises a slider S slidable along each side rails R. The tailgate platform P defines a support/carrying surface (e.g., generally flat). In one embodiment, the tailgate platform P may comprise a sheet or plank (metal or wood), or in the form of a netted material such as a metal screen or net or other perforated material, supported on the side rails R. Alternatively, the tailgate platform P may be an integrated structure (e.g., molded or stamped structure), with the side rails R integrated with the support surface.

In one embodiment, the tailgate frame assembly may include a wheel support frame WSF having ends each pivotally connected to a corresponding one of the side rails R, and at least one wheel TW is supported by the wheel support frame WSF below a bottom of the tailgate platform P. In the illustrated embodiment in FIGS. 1 to 3, the wheel support frame WSF supports two tailgate wheels TW. The wheels TW may be non-rotatable (as depicted in the embodiment of FIGS. 1 to 3), or pivotally supported by the wheel support frame WSF to rotate/swivel with respect to the wheel support frame WSF (see embodiment depicted in FIGS. 4 to 10).

In an alternate embodiment (not shown), the tailgate wheel(s) may be omitted entirely. In this embodiment, the vertical portion VS of the wheel support frame is still present to form the triangular truss structure (to be discussed in greater detail below), but there are no wheel supported below the tailgate platform P. Hence, the tailgate platform would be supported in a cantilevered manner, extending from the rear frame of the wagon frame assembly.

For each side rail R, there is a first connection member C1 having a first end pivotally connected to the slider S and a second end pivotally connected to the wheel support frame WSF at a location below the corresponding side rail R, and a second connection member C2 having a second end pivotally connected to the slider S and a second end pivotally to a location of the rear frame RF below the location along the corresponding bottom portion of the rear frame RF at which the proximal ends of the side rails R are pivotally connected to the base/bottom portion of the rear frame RF.

The tailgate frame assembly TFA can transition between a folded/collapsed state and an unfolded/extended state. FIGS. 3A to 3E are side views, depicting progressive state of unfolding/extending of the tailgate frame assembly TFA.

In the folded/collapsed state, the tailgate platform P is folded towards the rear frame RF of the wagon frame assembly WFA with its side rails R pivoted towards the rear frame RF, the wheel support frame WSF folded towards the bottom of the tailgate platform P, and the sliders S slide along the corresponding side rails R towards the rear frame RF of the wagon frame assembly WFA thus collapsing the first and second connection members C1 and C2 against the corresponding side rails R.

In the unfolded/extended state, the tailgate platform P is folded away from the rear frame RF of the wagon frame assembly WFA with its side rails R pivoted away from the rear frame RF, the wheel support frame WSF unfolded away from the bottom of the tailgate platform P, and the sliders S slide along the corresponding side rails R away from the rear frame RF of the wagon frame assembly WFA thus extending/expanding/pivoting the first and second connection members C1 and C2 away from the corresponding side rails R.

In the illustrated embodiment of the present invention, in the unfolded/extended state, the first and second connection members C1 and C2, the corresponding side rail R, a corresponding vertical portion VS of the wheel support frame WSF and a bottom portion of the rear frame RF of the wagon frame assembly WFA form a triangle truss structure comprising a first triangle T1 and a second triangle T2.

Figure 3A:
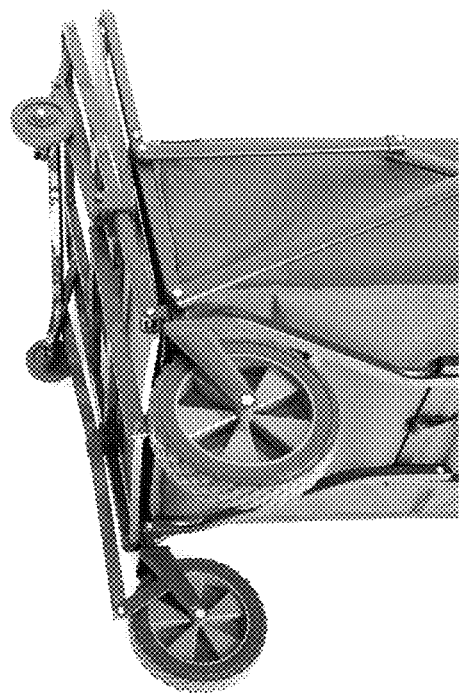
FIGS. 3A to 3E are side views, depicting progressive state of unfolding/extending of the tailgate frame assembly.
Figure 3B:
Figure 3C:
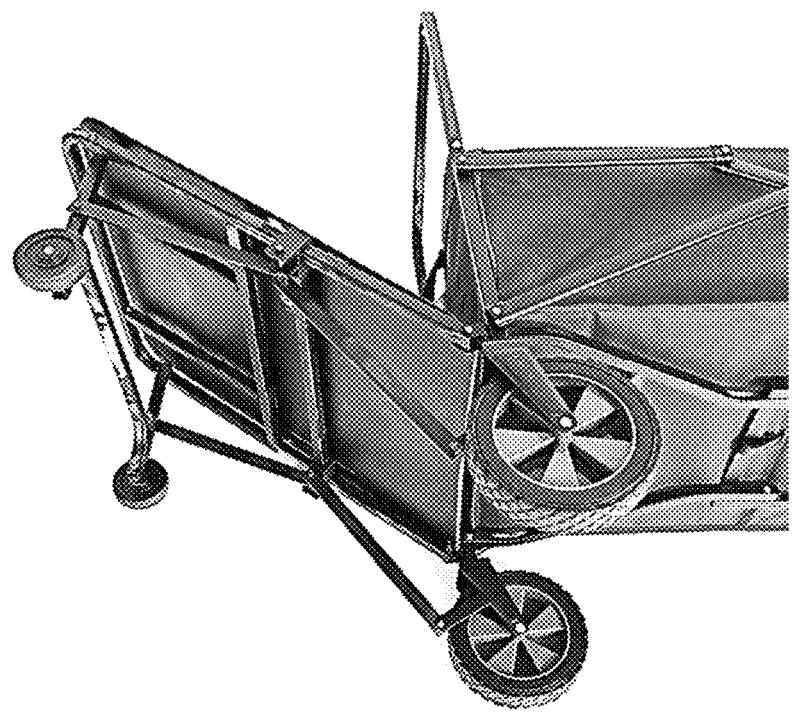
Figure 3D:
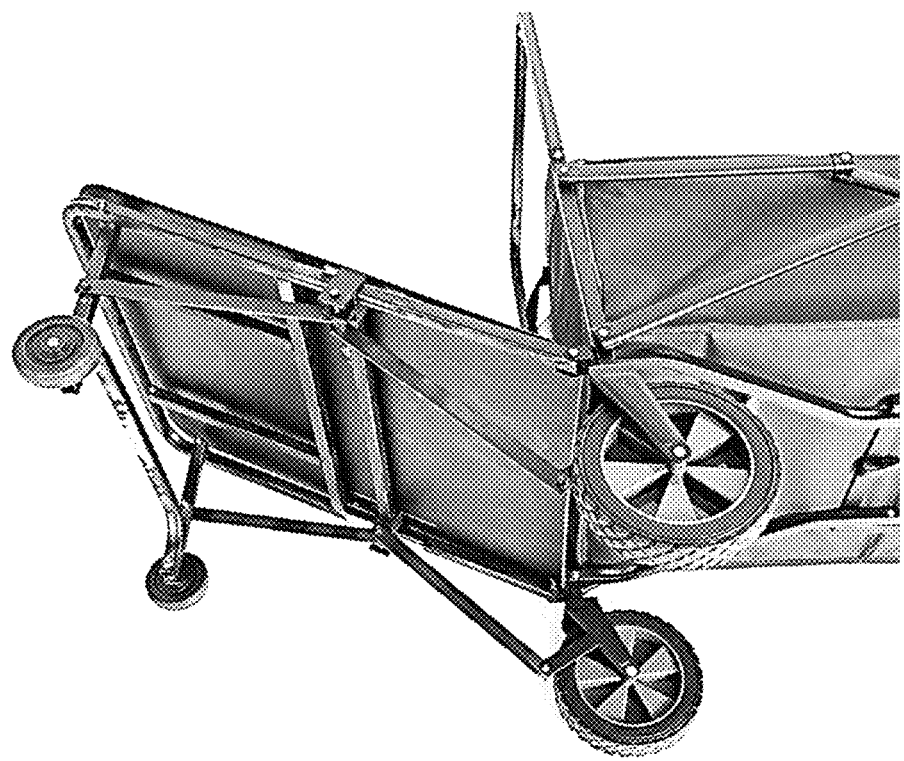
Figure 3E:
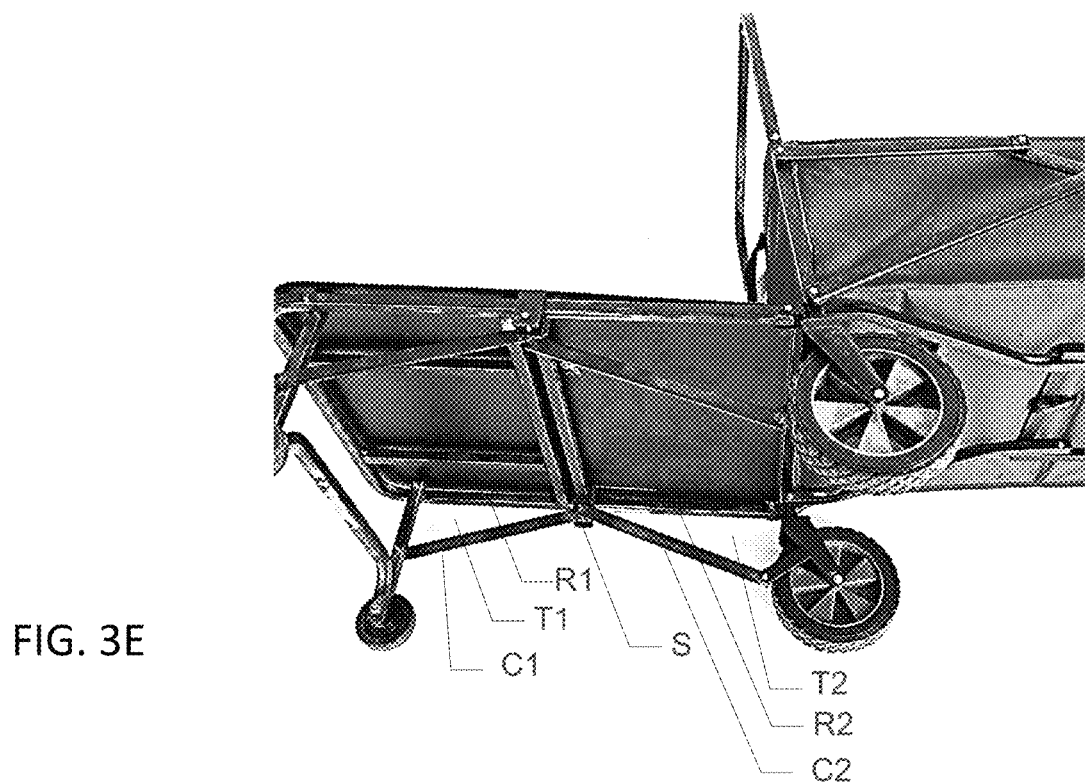

More specifically, in the illustrated embodiment of FIG. 3E, the first connection member C1, a corresponding vertical portion VS of the wheel support frame WSF and the section R1 of the corresponding side rail R form the first triangle T1 in the triangle truss structure, and wherein the second connection member C2, the corresponding bottom portion of the rear frame RF and the section R2 of the corresponding side rail R form the second triangle T2 in the triangle truss structure.

In the illustrated embodiment of the present invention, the corresponding bottom portion of the rear frame RF comprises a vertical portion VF and an extended portion EX extending to connect to a support for the correspond rear wheel RW. As illustrated, the support for each of the rear wheels RW are not pivotally supported by the rear frame RF to rotate/swivel with respect to the rear frame RF. However, as illustrated, the front wheels FW are pivotally supported by the front frame FF to rotate/swivel with respect to the front frame FF.

Referring to FIG. 3A (see also the alternate embodiment of FIG. 4A), in use, when the wagon frame assembly WFA is in its fully extended/expanded configuration, the tailgate frame assembly TFA may be kept in the folded/collapsed state. If use of the tailgate is desired, e.g., to carry an ice chest or other items on the tailgate platform P, the tailgate frame assembly TFA is unfolder/extended to move/pivot the tailgate platform P away from the rear frame RF, until it is generally horizontal with the tailgate wheel(s) TW touching the support surface (e.g., ground) on which the wagon W will be rolled. In other words, the wagon W could be used with or without the tailgate frame assembly TFA in the unfolded/extended state.

Figure 4A:
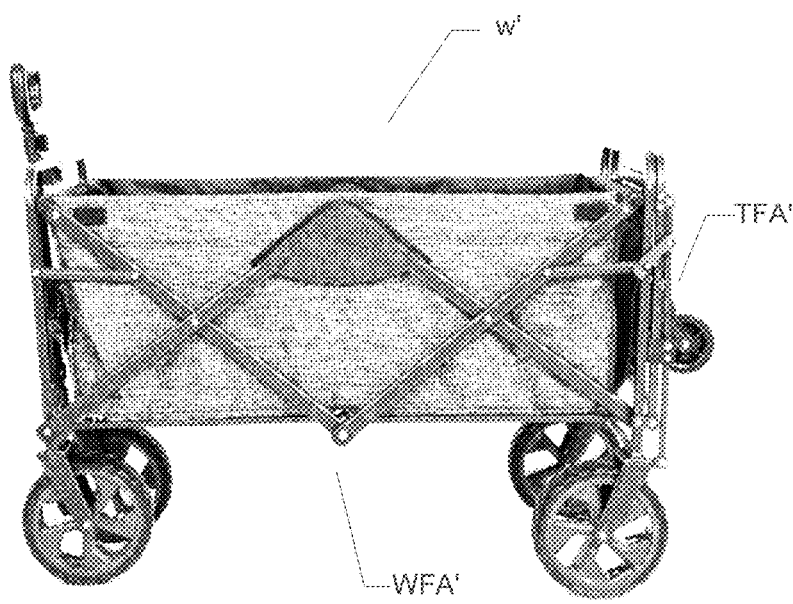
FIGS. 4A to 4C are side views of a collapsible wagon having a tailgate in accordance with a second embodiment of the present invention, depicting progressive states of unfolding/extending of a tailgate frame assembly.
Figure 4B:
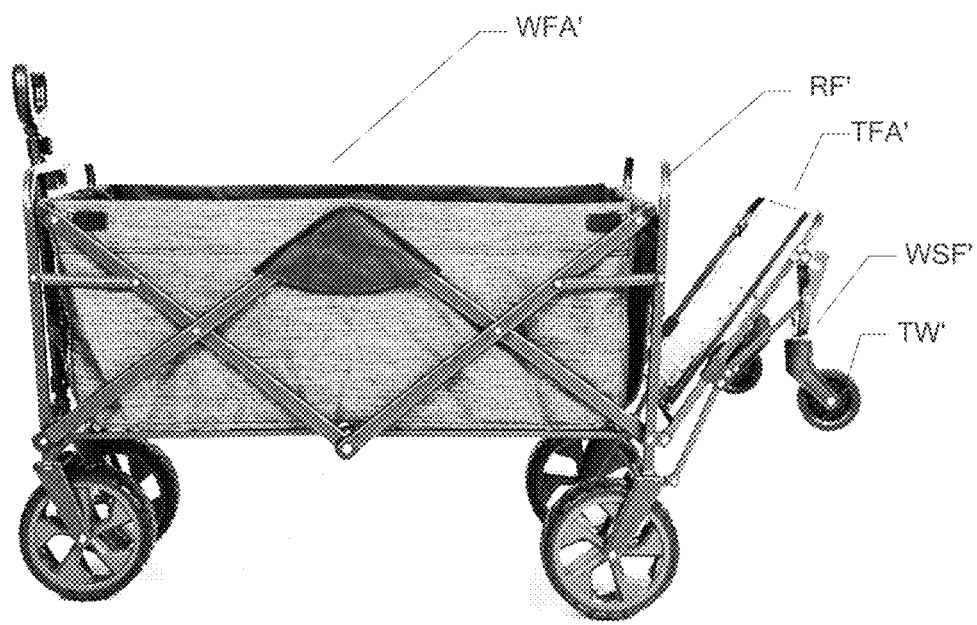
Figure 4C:
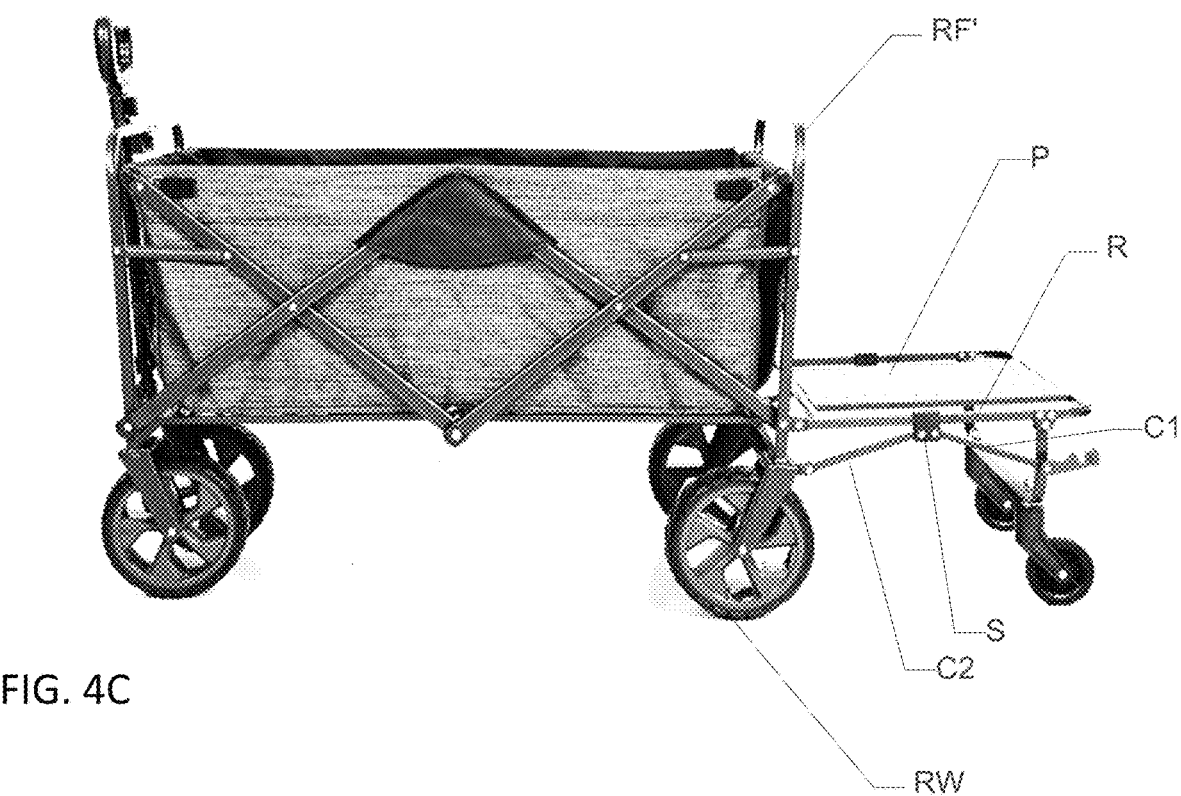

FIGS. 4A to 4C are side views of a collapsible wagon W' having a tailgate in accordance with a second embodiment of the present invention, depicting progressive states of unfolding/extending of a tailgate frame assembly. This embodiment is similar to the earlier embodiment described above, with some structural changes in the wagon frame assembly WFA' and the tailgate frame assembly TFA' without departing from the scope, spirit, principles, functions and operations of the present invention. For example, in this embodiment, the tailgate wheels TW' are shown to be rotatable/swiveled at the bottom of the wheel support frame WSF'. The rear frame RF' in this embodiment is shorter than that of the previous embodiment.

Figure 5A:
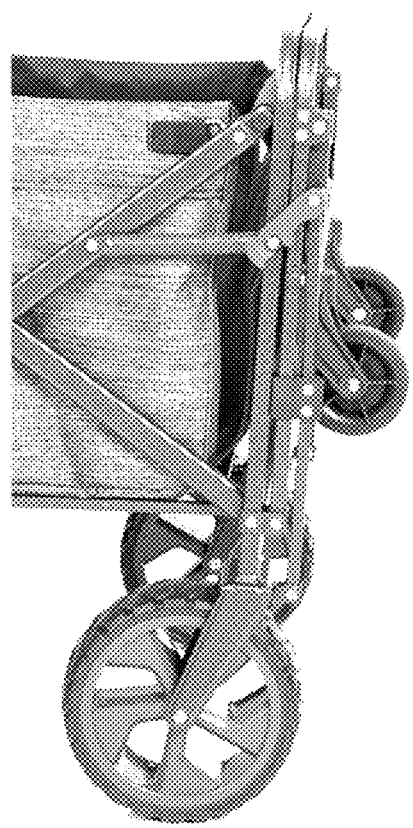
FIGS. 5A to 5C are enlarged side views, depicting progressive states of unfolding/extending of the tailgate frame assembly in accordance with the second embodiment of the present invention.
Figure 5B:
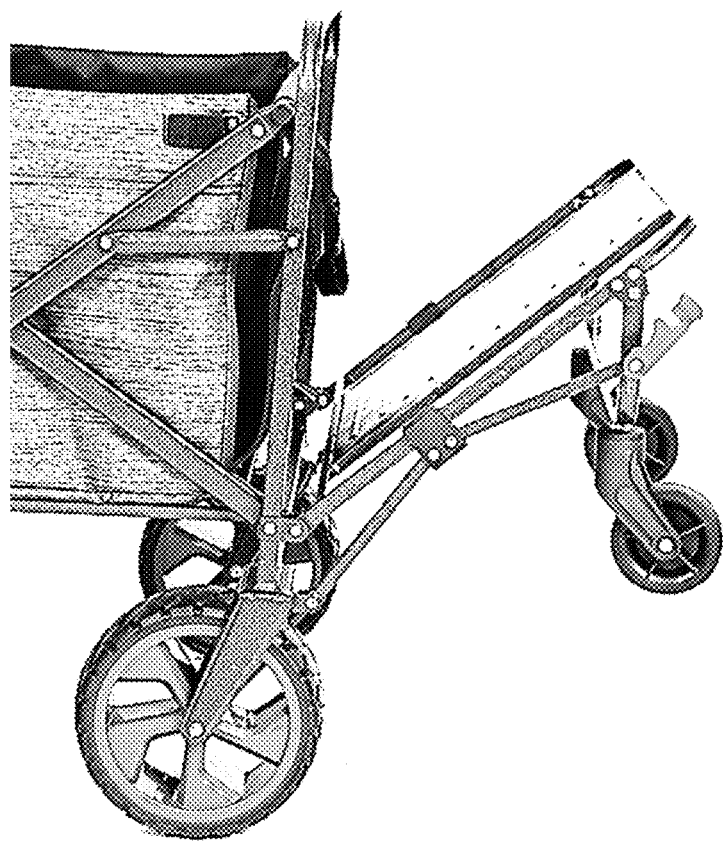
Figure 5C:
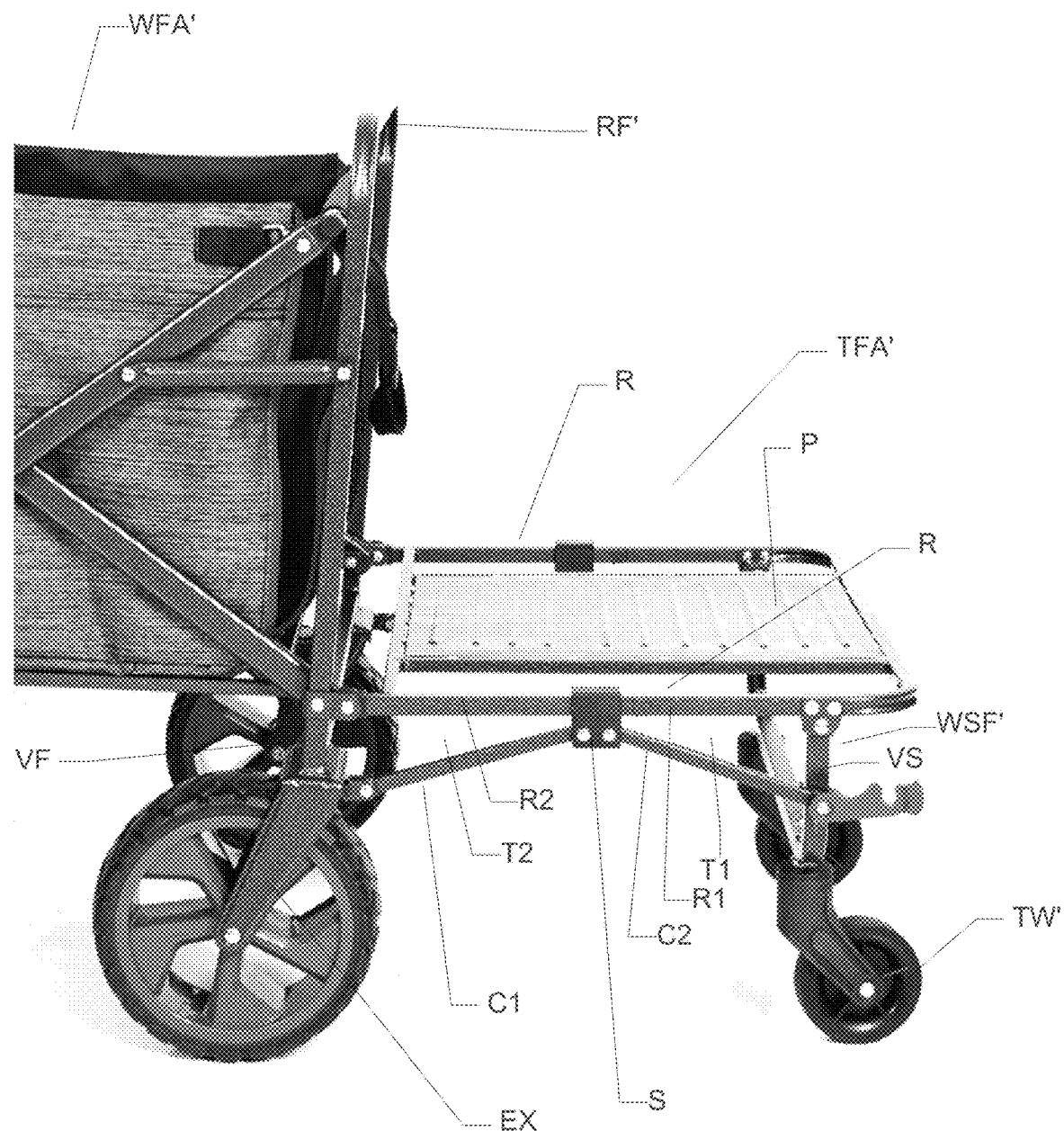
Figure 6A:
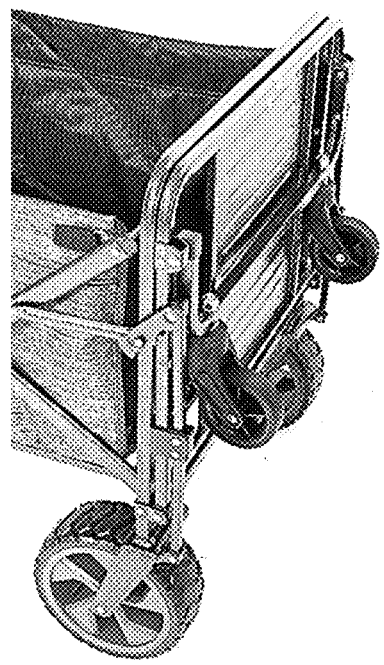
FIGS. 6A to 6C are perspective views, depicting progressive states of unfolding/extending of the tailgate frame assembly in accordance with the second embodiment of the present invention.
Figure 6B:
Figure 6C:
Figure 7A:
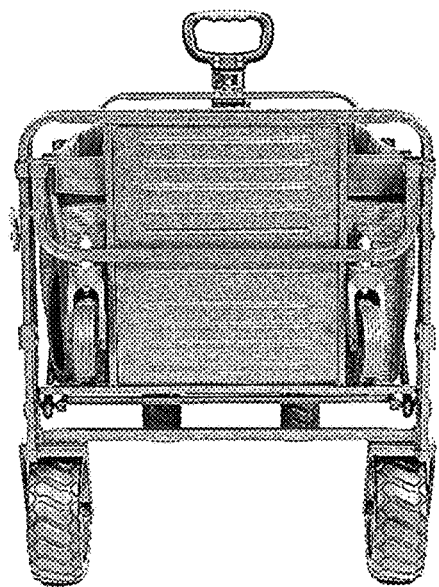
FIGS. 7A to 7C are front views (rear view of the wagon frame), depicting progressive states of unfolding/extending of the tailgate frame assembly in accordance with the second embodiment of the present invention.
Figure 7B:
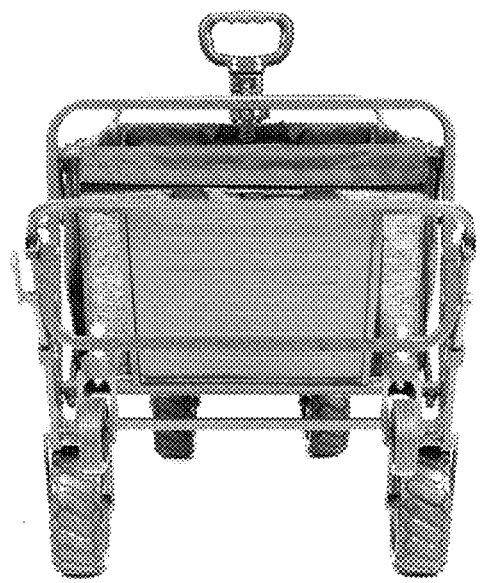
Figure 7C:
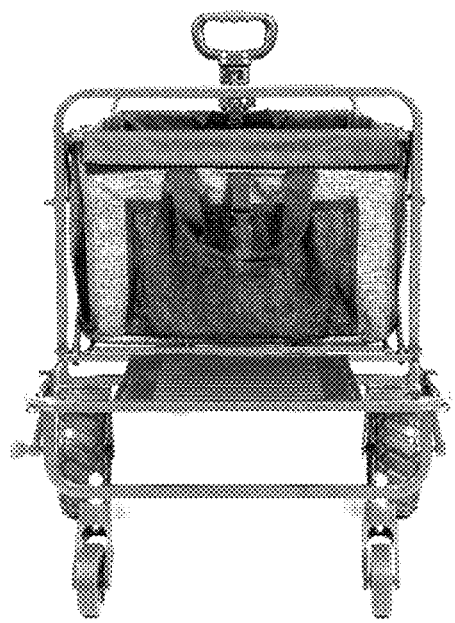
Figure 8A:
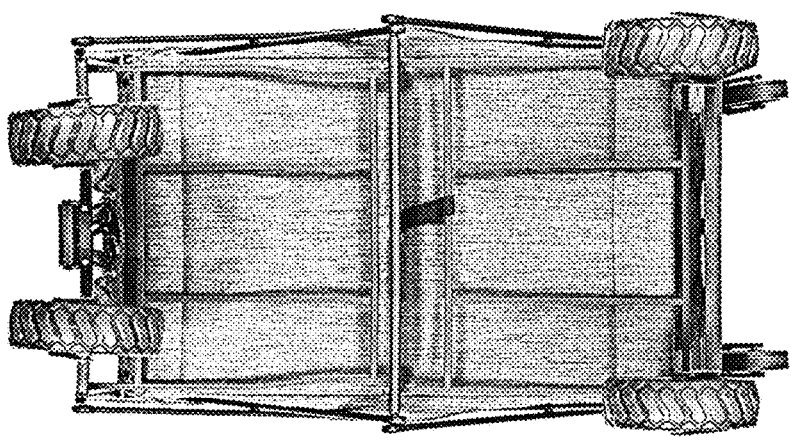
FIGS. 8A to 8C are bottom views, depicting progressive states of unfolding/extending of the tailgate frame assembly in accordance with the second embodiment of the present invention.
Figure 8B:
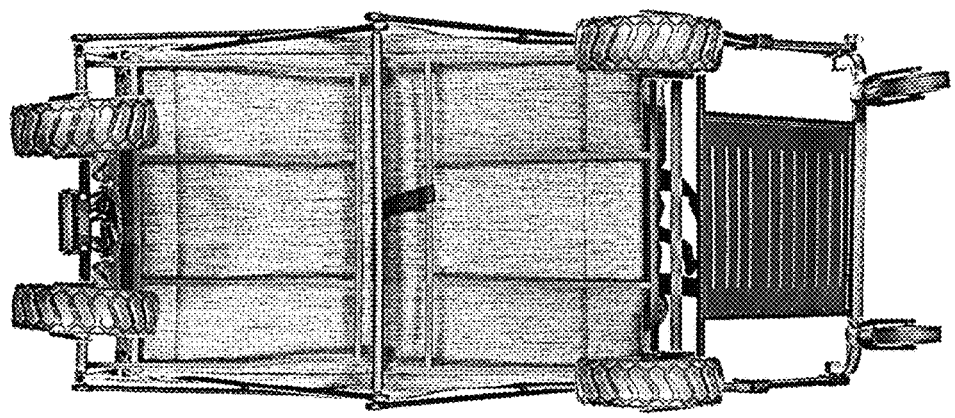
Figure 8C:
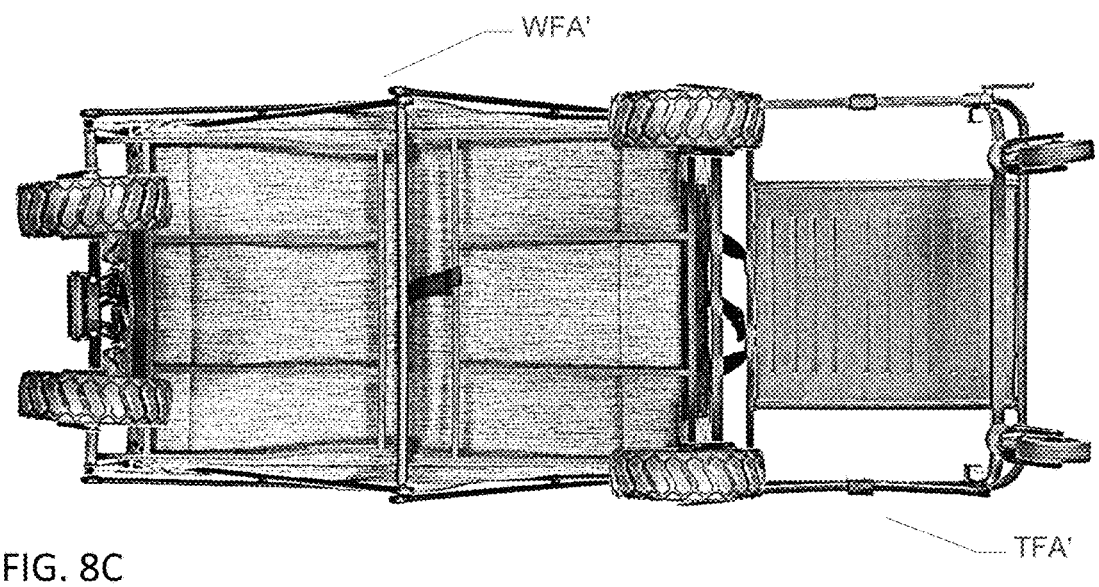
Figure 9A:
FIGS. 9A to 9C are top views, depicting progressive states of unfolding/extending of the tailgate frame assembly in accordance with the second embodiment of the present invention.
Figure 9B:
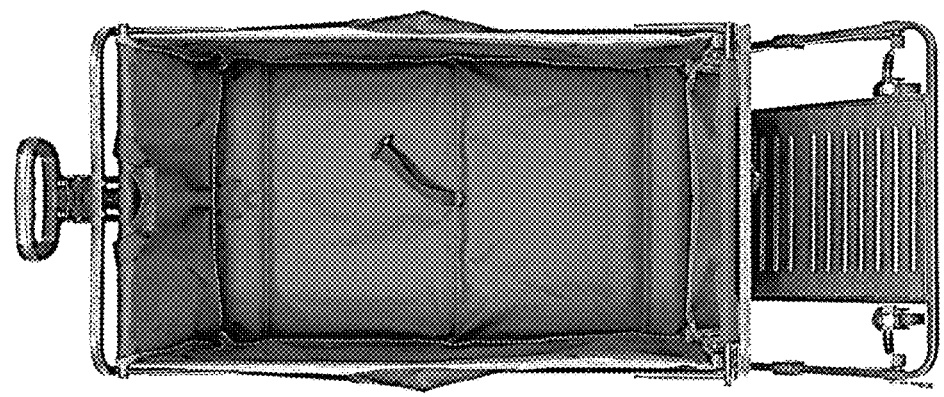
Figure 9C:
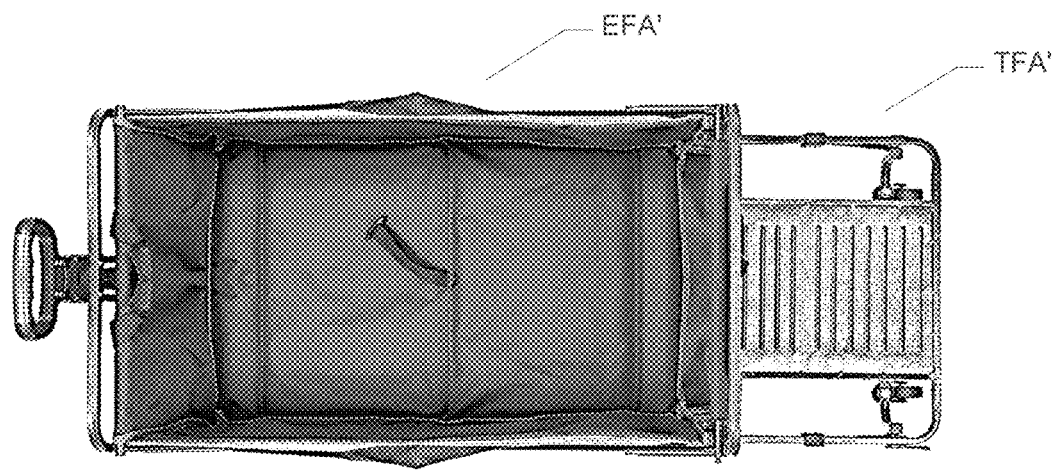
Figure 10:
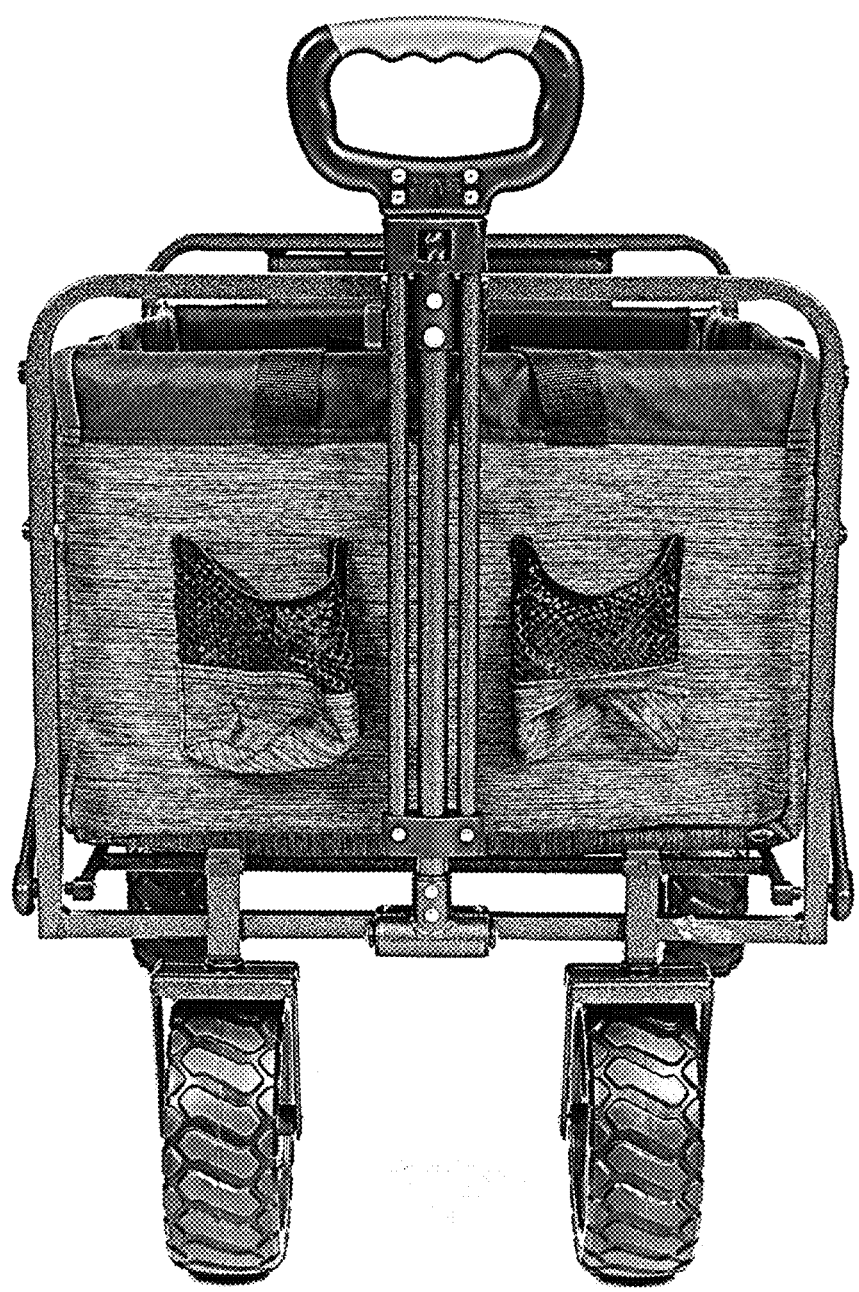
FIG. 10 is a front view of the wagon frame, showing wheels that are pivotally supported by the front frame to rotate with respect to the front frame, in accordance with one embodiment of the present invention.

FIGS. 5A to 5C are enlarged side views, depicting progressive states of unfolding/extending of the tailgate frame assembly in accordance with the second embodiment of the present invention. FIGS. 6A to 6C are perspective views, depicting progressive states of unfolding/extending of the tailgate frame assembly in accordance with the second embodiment of the present invention. FIGS. 7A to 7C are front views (rear view of the wagon frame), depicting progressive states of unfolding/extending of the tailgate frame assembly in accordance with the second embodiment of the present invention.

Having described the invention by the description and illustrations above, it should be understood that these are exemplary of the invention and are not to be considered as limiting. Accordingly, the invention is not to be considered as limited by the foregoing description, but includes any equivalents.

The invention claimed is:

1. A collapsible wagon, comprising:
a wagon frame assembly having a rear frame; and
a collapsible tailgate frame assembly coupled to the rear frame, wherein the tailgate frame assembly comprises:
a tailgate platform having a pair of side rails, each having an end pivotally connected to a corresponding bottom portion near a base of the rear frame of the wagon frame assembly;
a slider slidable along each of the pair of side rails;
a slider connector comprising a plurality of connector members extending below and away from the side rails, wherein each connector member is pivotally connected to a corresponding slider at a pivot joint that moves with the slider as it slides along the corresponding side rail,
wherein the tailgate frame assembly transitions between a collapsed state and an extended state with each slider sliding along a corresponding side rail.

2. The collapsible wagon as in claim 1, wherein the tailgate frame assembly further comprises a wheel support frame pivotally connected to a corresponding one of the side rails.

3. The collapsible wagon as in claim 2, wherein the slider connector of the tailgate frame assembly further comprises a first connection member pivotally connected to the slider and the wheel support frame, and a second connection member pivotally connected to the slider and the rear frame.

4. The collapsible wagon as in claim 3, wherein for each side rail, the first connection member has a first end pivotally connected to the slider and a second end pivotally connected to the wheel support frame at a location below the corresponding side rail, and the second connection member has a first end pivotally connected to the slider and a second end pivotally connected to a location of the rear frame below the location of the corresponding bottom portion of the rear frame at which the end of the side rail is pivotally connected to the bottom portion near the base of the rear frame.

5. The collapsible wagon as in claim 4, wherein when the tailgate frame assembly is in the extended state, the first and second connection members, the corresponding side rail, a corresponding vertical portion of the wheel support frame and the bottom portion of the rear frame of the wagon form a triangle truss structure comprising a first triangle and a second triangle.

6. The collapsible wagon as in claim 5, wherein when the tailgate frame assembly is in the extended state, the first connection member, the corresponding vertical portion of the wheel support frame and a first section of the corresponding side rail form the first triangle in the triangle truss structure.

7. The collapsible wagon as in claim 6, wherein when the tailgate frame assembly is in the extended state, the second connection member, the corresponding bottom portion of the rear frame and a second section of the corresponding side rail form the second triangle in the triangle truss structure.

8. The collapsible wagon as in claim 7, wherein when the tailgate frame assembly is in the collapsed state, the tailgate platform is folded towards the rear frame of the wagon with the side rails pivoted towards the rear frame, the wheel support frame is folded towards the bottom of the tailgate platform, and the sliders slide along the corresponding side rails towards the rear frame of the wagon frame assembly, thus collapsing the first and second connection members against the corresponding side rails.

9. The collapsible wagon as in claim 8, wherein when the tailgate frame assembly is in the extended state, the tailgate platform is folded away from the rear frame of the wagon frame assembly with its side rails pivoted away from the rear frame, the wheel support frame is unfolded away from the bottom of the tailgate platform, and the sliders slide along the corresponding side rails away from the rear frame of the wagon frame assembly thus pivoting the first and second connection members away from the corresponding side rails.

10. The collapsible wagon as in claim 4, wherein when the tailgate frame assembly is in the collapsed state, the tailgate platform is folded towards the rear frame of the wagon with the side rails pivoted towards the rear frame, the wheel support frame is folded towards the bottom of the tailgate platform, and the sliders slide along the corresponding side rails towards the rear frame of the wagon frame assembly, thus collapsing the first and second connection members against the corresponding side rails.

11. The collapsible wagon as in claim 10, wherein when the tailgate frame assembly is in the extended state, the tailgate platform is folded away from the rear frame of the wagon frame assembly with its side rails pivoted away from the rear frame, the wheel support frame is unfolded away from the bottom of the tailgate platform, and the sliders slide along the corresponding side rails away from the rear frame of the wagon frame assembly thus pivoting the first and second connection members away from the corresponding side rails.

12. The collapsible wagon as in claim 3, wherein the corresponding bottom portion of the rear frame comprises a vertical portion and an extended portion extending therefrom to support a corresponding rear wheel, and wherein the second connection member is pivotally connected to the extended portion.

13. The collapsible wagon as in claim 12, wherein the extended portion supports the rear wheel in a manner that they do not pivot with respect to the vertical portion of the bottom portion of the rear frame.

14. The collapsible wagon as in claim 13, wherein the front wheels are pivotally supported by the front frame to rotate with respect to the front frame.

15. The collapsible wagon as in claim 3, wherein the rear frame supports rear wheels at the base of the rear frame, and wherein the collapsible wagon frame assembly further comprises a collapsible frame having a front frame supporting front wheels at a base of the front frame, and a pair of side frames that are each pivotally collapsible, wherein the front frame, the rear frame and the pair of side frames in their extended state define a space for receiving a basket for holding items to be transport by the collapsible wagon.

16. The collapsible wagon as in claim 1, wherein the tailgate frame assembly further comprises at least one tailgate wheel supported by the wheel support frame below a bottom of the tailgate platform.

17. The collapsible wagon as in claim 1, wherein the wagon frame assembly is collapsible into a folded structure.

18. A collapsible wagon, comprising:
a wagon frame assembly having a rear frame; and
a collapsible tailgate frame assembly coupled to the rear frame, wherein the tailgate frame assembly comprises:
a tailgate platform having a pair of side rails, each having an end pivotally connected to a corresponding bottom portion near a base of the rear frame of the wagon frame assembly;
a wheel support frame pivotally connected to a corresponding one of the side rails;
a slider slidable along each of the pair of side rails; and
a first connection member pivotally connected to the slider and the wheel support frame, and a second connection member pivotally connected to the slider and the rear frame, wherein for each side rail, the first connection member has a first end pivotally connected to the slider and a second end pivotally connected to the wheel support frame at a location below the corresponding side rail, and the second connection member has a first end pivotally connected to the slider and a second end pivotally connected to a location of the rear frame below the location of the corresponding bottom portion of the rear frame at which the end of the side rail is pivotally connected to the bottom portion near the base of the rear frame,
wherein the tailgate frame assembly transitions between a collapsed state and an extended state with each slider sliding along a corresponding side rail.

* * * * *